United States Patent
Kanematsu

(10) Patent No.: US 9,298,537 B2
(45) Date of Patent: Mar. 29, 2016

(54) DETECTION, DETERMINATION, AND EXTERNAL ERROR LOG STORAGE OF A FAULT CONDITION IN A USER INTERFACE

(75) Inventor: Shinichi Kanematsu, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 13/530,194

(22) Filed: Jun. 22, 2012

(65) Prior Publication Data

US 2013/0007537 A1 Jan. 3, 2013

(30) Foreign Application Priority Data

Jun. 24, 2011 (JP) ................................ 2011-140674

(51) Int. Cl.
*G06F 11/07* (2006.01)
*G06F 11/30* (2006.01)

(52) U.S. Cl.
CPC ........ *G06F 11/0787* (2013.01); *G06F 11/0751* (2013.01); *G06F 11/3055* (2013.01)

(58) Field of Classification Search
CPC .................................................. G06F 11/0787
USPC .................................................. 714/47.1, 48
See application file for complete search history.

(56) References Cited

U.S. PATENT DOCUMENTS

| | | | | |
|---|---|---|---|---|
| 4,947,397 | A * | 8/1990 | Sobel et al. ..................... | 714/45 |
| 5,218,406 | A * | 6/1993 | Ebner .............................. | 399/11 |
| 5,617,535 | A * | 4/1997 | Aizawa et al. .................. | 714/46 |
| 6,073,085 | A * | 6/2000 | Wiley et al. .................... | 702/118 |
| 6,732,301 | B1 * | 5/2004 | Landry et al. .................. | 714/43 |
| 6,895,003 | B1 * | 5/2005 | Kobayashi et al. ............ | 370/389 |
| 2002/0177362 | A1 * | 11/2002 | Chang ............................. | 439/638 |
| 2005/0097405 | A1 * | 5/2005 | Sesek et al. .................... | 714/48 |
| 2007/0207800 | A1 * | 9/2007 | Daley et al. .................... | 455/425 |
| 2007/0288628 | A1 * | 12/2007 | Sadovsky et al. ............. | 709/224 |
| 2008/0030782 | A1 * | 2/2008 | Watanabe ....................... | 358/1.16 |
| 2009/0237741 | A1 * | 9/2009 | Kurahashi ...................... | 358/406 |
| 2010/0318848 | A1 * | 12/2010 | Yang et al. ...................... | 714/30 |
| 2011/0138084 | A1 * | 6/2011 | Hirata et al. ................... | 710/10 |
| 2011/0198328 | A1 * | 8/2011 | Casner ........................... | 219/125.1 |

FOREIGN PATENT DOCUMENTS

JP 2005-122451 A 5/2005

OTHER PUBLICATIONS

McQ Productions/Software Systems, ELogger Error and Time Code Break Logging, 2010 [Retrieved on Feb. 5, 2014], Retrieved from the Internet: <http://www.mcqpro.com/html/ELogger.html>, pp. 1-3.*

* cited by examiner

*Primary Examiner* — Esaw Abraham
*Assistant Examiner* — Paul Contino
(74) *Attorney, Agent, or Firm* — Rossi, Kimms & McDowell LLP

(57) ABSTRACT

An information processing apparatus is capable of automatically determining whether an operation log needs to be written to an external device when the external device is connected to the information processing apparatus and saving the operation log into the external device when necessary. A determination is made as to whether or not content for retrieving an operation log is present in an external device upon detection of connection of the external device. The operation log is retrieved from a holding unit if a result of the determination shows that the user interface control unit is in an error condition. The retrieved operation log is saved into a storage unit of the external device.

6 Claims, 6 Drawing Sheets

DETECTION, DETERMINATION, AND EXTERNAL ERROR LOG STORAGE OF A FAULT CONDITION IN A USER INTERFACE

BACKGROUND OF THE INVENTION

1. Field of the Invention

The present invention relates to an information processing apparatus, an information processing method, and a storage medium storing a program therefor, and more particularly, to a technique for automatically executing a program in an information processing apparatus including a device interface.

2. Description of the Related Art

Control firmwares in recent image processing apparatuses tend to increase in scale and complexity with increase and enhancing in function of the image processing apparatuses. During the development phase of a control firmware, an operation log of the firmware is used to carry out a functional check and investigation for the cause of a failure, for debugging purposes. It should be noted that the operation log of the firmware is one of essential factors for firmware development of an image processing apparatus.

For example, techniques for an image processing apparatus including a device interface such as Universal Serial Bus (hereinafter referred to as "USB") include a technique which allows acquisition of the operation log by an operation through a user interface (hereinafter referred to as "UI") of an information processing apparatus. Since the image processing apparatus can also automatically perform predetermined processing without the operation through the UI, upon detection of connection of an external device as a trigger, the operation log can also be retrieved automatically. For example, there is proposed a technique for automatically executing an arbitrary application stored in a USB memory medium according to the contents of the USB memory medium by just operating a USB connection (e.g., Japanese Laid-Open Patent Publication (Kokai) No. 2005-122451).

Combination of the above two techniques allows implementation of the function of automatically retrieving an operation log when the USB memory medium is mounted. In some cases, the data size of the operation log is enormous, and it takes a long time to retrieve the operation log. It is thus desirable that retrieving the operation log be performed only when necessary, i.e., when debugging of firmware is necessary.

However, according to a conventional technique, if the firmware controlling the UI of the image processing apparatus stops, a unit itself for saving the operation log into the USB memory medium through the UI cannot be activated, and the operation log cannot be retrieved. This interferes with debugging. According to the technique disclosed in Japanese Laid-Open Patent Publication (Kokai) No. 2005-122451, automatic execution of an application is controlled according to the contents of the USB memory medium. Accordingly, automatically executing the application for acquiring the operation log results from retrieving the operation log even without the need for retrieving.

SUMMARY OF THE INVENTION

The present invention provides an information processing apparatus capable of automatically determining whether an operation log needs to be written to an external device when the external device is connected to the information processing apparatus and saving the operation log into the external device when necessary.

In a first aspect of the present invention, there is provided a n information processing apparatus comprising a user interface, a user interface control unit adapted to recognize an operation input at the user interface, performs information processing associated with the operation input, and control display of a status of the information processing apparatus in the user interface, a monitoring unit adapted to monitor the user interface control unit to determine whether or not the user interface control unit is in an error condition, a device interface adapted to allow use of an external device including a storage unit when the external device is connected to the information processing apparatus, a detection unit adapted to detect connection of the external device, and a holding unit adapted to hold an operation log of the information processing apparatus, wherein the detection unit comprises a content determination unit adapted to determine whether or not content for retrieving the operation log is present in the external device upon detection of connection of the external device, and a notification unit adapted to notify the monitoring unit of a message that the external device is connected if the content determination unit determines that the content is present in the external device, and wherein the monitoring unit includes an error determination start unit adapted to control to start determining whether or not the user interface control unit is in an error condition when the message is notified to the monitoring unit by the notification unit, a retrieving unit adapted to retrieve the operation log from the holding unit if a result of the determination controlled to start by the error determination start unit shows that the user interface control unit is in an error condition, and an operation log saving unit adapted to save the operation log retrieved by the retrieving unit, into the storage unit of the external device.

In a second aspect of the present invention, there is provided an information processing apparatus having a user interface, the information processing apparatus comprising a control unit adapted to control the user interface, a holding unit adapted to hold an operation log of the information processing apparatus, a detection unit adapted detect that an external device having a storage unit is connected to the information processing apparatus, a determination unit adapted to determine whether or not the control unit is in an error condition, and a saving unit adapted to save the operation log having been held by the holding unit in the case where the detecting unit detects that the external device is connected and the determination unit determines that the control unit is in the error condition.

According to the present invention, an operation log of an information processing apparatus can be retrieved automatically when an external device is connected to the information processing apparatus, and the operation log of the information processing apparatus needs to be retrieved. Especially when a user interface control unit of the information processing apparatus has been stopped, the operation log can be efficiently retrieved.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

<Hardware Configuration of Image Processing Apparatus>

Figure 1:
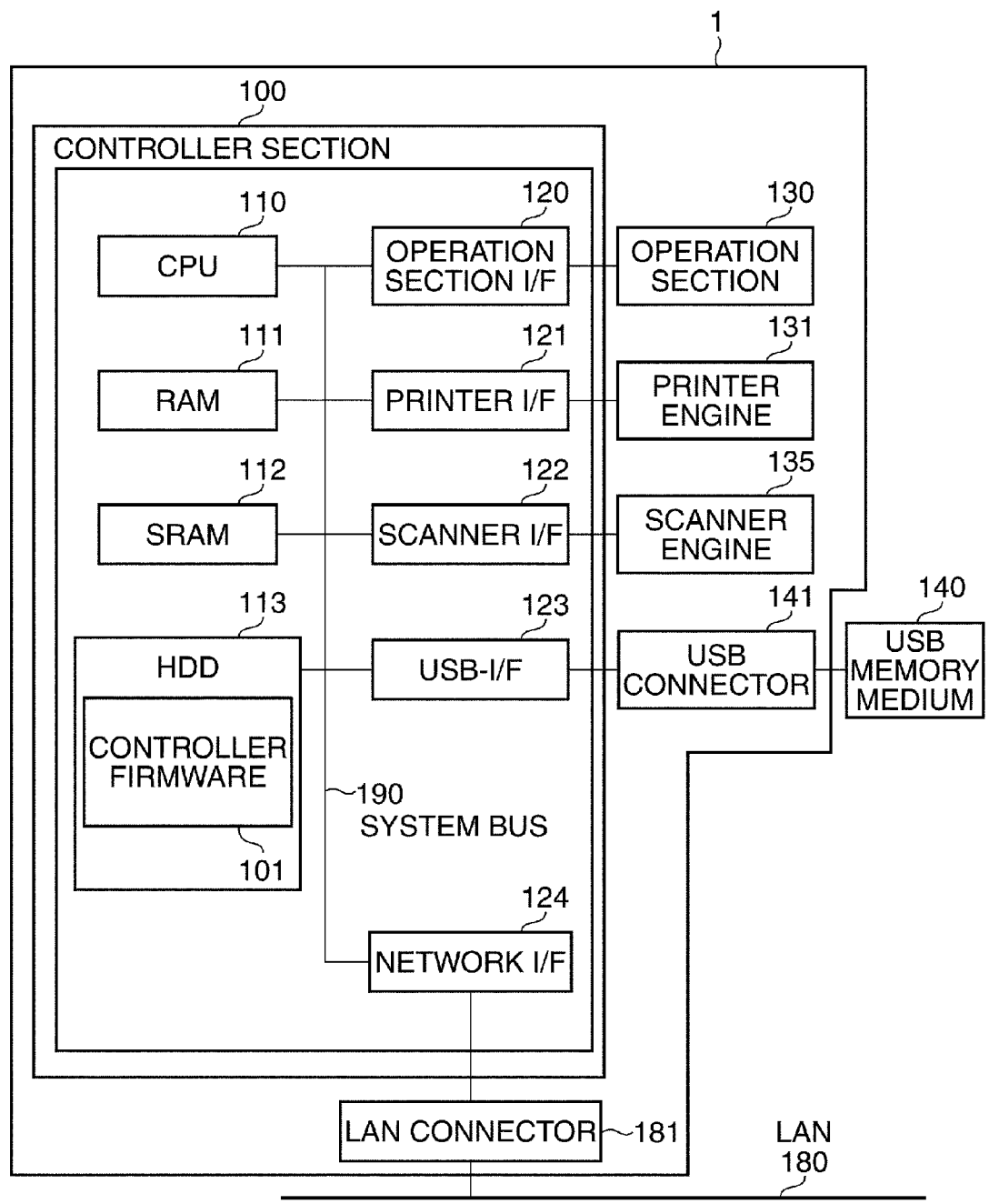
FIG. 1 is a block diagram showing a hardware configuration of an image processing apparatus according to an embodiment of the present invention.

FIG. 1 is a block diagram showing a hardware configuration of an image processing apparatus 1 according to an embodiment of the present invention. The image processing apparatus 1 comprises a controller section 100 which is responsible for the center function of the image processing apparatus 1 and performs overall control of the image processing apparatus 1, an operation section 130, a printer engine 131, a scanner engine 135, a USB connector 141, and a LAN connector 181. The controller section 100 comprises a CPU 110, a RAM 111, an SRAM 112, an HDD 113, and a plurality of device interfaces (device I/Fs) to be described later, all of which can be connected to each other via a system bus 190. Controller firmware 101 (firmware) is recorded on the HDD 113. When the image processing apparatus 1 is activated, the controller firmware 101 is loaded into the RAM 111 and is expanded such that the CPU 110 can run the controller firmware 101. It should be noted that the HDD 113 is used to temporarily or permanently store a print image, a scan image, and the like, in addition to holding the controller firmware 101. The configuration of the controller firmware 101 will be described later in detail with reference to FIG. 2.

The SRAM 112 is a nonvolatile memory which holds set values associated with the operation of the controller section 100, the printer engine 131, and the scanner engine 135. The CPU 110 reads out a corresponding program or set value from the SRAM 112 as required for operation and controls the controller section 100, the printer engine 131, and the scanner engine 135 according to the read-out program or set value.

The plurality of device interfaces (device I/Fs) in the controller section 100 are interfaces for allowing use of various devices and comprises an operation section interface (operation section I/F) 120, a network interface (network I/F) 124, a printer interface (printer I/F) 121, a scanner interface (scanner I/F) 122, and a USB interface (USB-I/F) 123. The controller firmware 101, expanded in the RAM 111 and ready to be run, performs integrated device control via the device I/Fs and implements system operations such as copying, scanning, and printing.

The operation section I/F 120 is connected to the operation section 130 that is a user interface via a dedicated bus. A user interface control process (hereinafter referred to as "UI control process") 220 included in the controller firmware 101 allows key entry and display of device status at the operation section 130 (see FIG. 2). It should be noted that the details of the operation section 130 will be described later in detail with reference to FIG. 3.

The printer engine 131 receives a control instruction from the controller firmware 101 via the operation section I/F 120 and forms an image on a recording medium such as a paper sheet. The scanner engine 135 receives a control instruction from the controller firmware 101 via the scanner I/F 122 and reads an image of an original. When a USB memory medium 140 which is an external device is connected to the USB connector 141, the USB memory medium 140 is recognized by the controller firmware 101 via the USB-I/F 123 and serves as an object from/to which data is to be read/written. In the present embodiment, the image processing apparatus 1 can perform data communication with an external network (not shown) via a LAN cable 180 which is connected to the network I/F 124 and LAN connector 181.

<Software Configuration of Controller Firmware 101>

Figure 2:
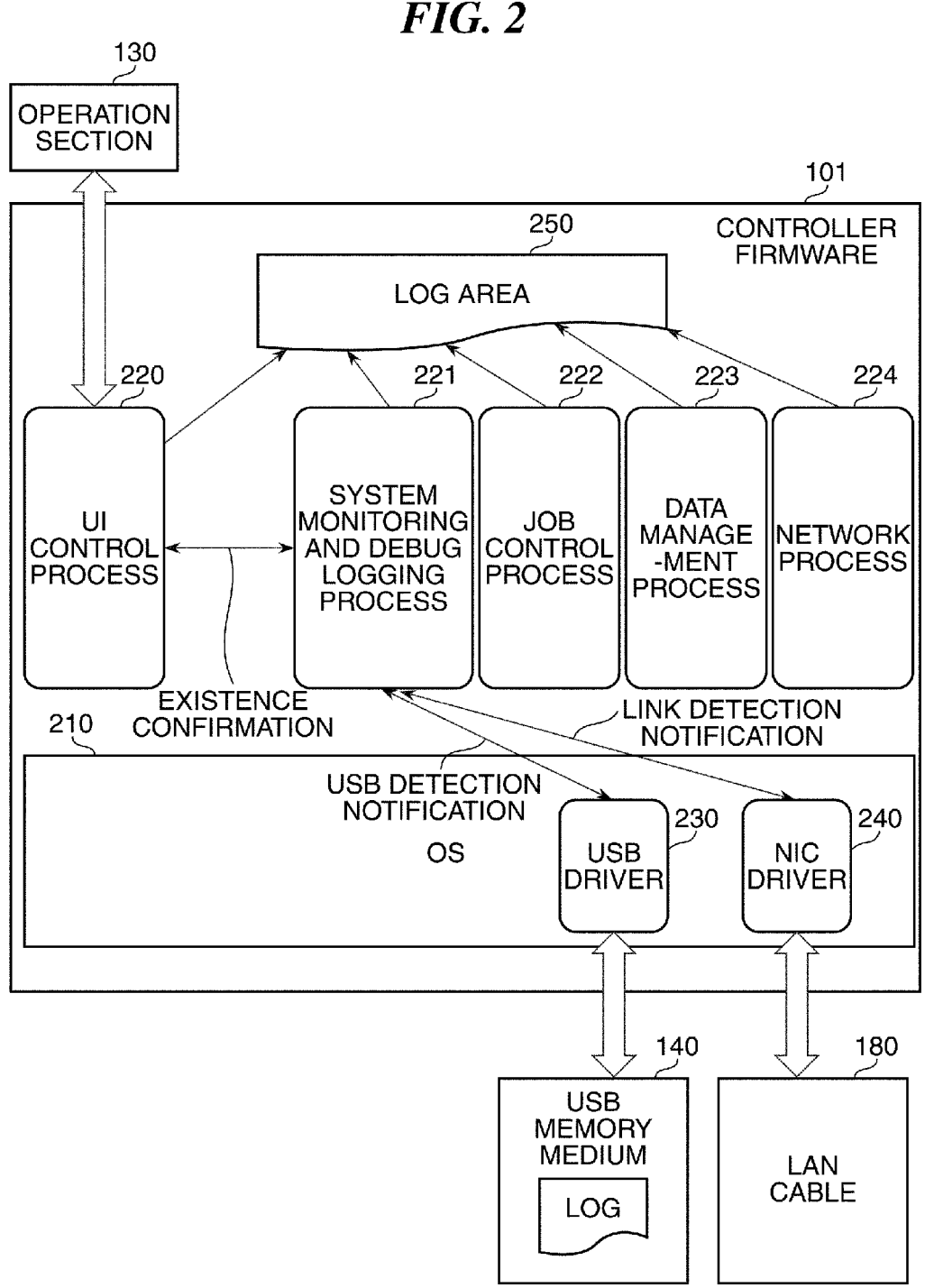
FIG. 2 is a diagram showing a software configuration of a controller firmware shown in FIG. 1.

FIG. 2 is a diagram showing a software configuration of the controller firmware 101 shown in FIG. 1. An operating system (hereinafter referred to as "OS") 210 is a piece of software which serves as a base portion of the controller firmware 101. The OS 210 is configured so as to be the most robust components of the controller firmware 101 as a key portion of a control system of the image processing apparatus 1. The OS 210 is configured such that the operation of the OS 210 itself is continued even when various processes (to be described later) stop.

A USB driver 230 which is one of device drivers included in the OS 210 is a detection unit which detects insertion/retraction of the USB memory medium 140 into/from the USB connector 141. The USB driver 230 also writes data to the USB memory medium 140 connected to the USB connector 141 via the USB-I/F 123 and reads data from the USB memory medium 140. A network I/F driver (hereinafter referred to as "NIC driver") 240 which is another device driver is a detection unit which detects insertion/retraction (linking) of the LAN cable 180 into/from (to) the LAN connector 181 and controls network communication via the LAN cable 180.

As shown in FIG. 2, the image processing apparatus 1 according to the present embodiment includes a plurality of application processes (hereinafter referred to as "processes") to be run on the OS 210 for implementing functions. The term "process" in the present embodiment refers to an executable unit of a program, which is a component of the firmware. The processes are configured as executable units of a program so as to be highly independent of each other. Accordingly, even when a certain process stops due to, e.g., a bug, the other processes can continue operation without stopping. Since the processes are run and controlled by the OS 210 respectively, even if a certain process stops or falls into a software exception condition, the operation of the OS 210 does not stop. The processes start being run as the firmware with the activation of the controller section 100. The processes will be specifically described below.

The UI control process 220 is a user interface control unit which is responsible for operation control of the operation section 130 and implements functions, such as recognition of an operation input at the operation section 130, information processing associated with an operation input, and control of the operation section 130 for displaying the status of the image processing apparatus 1. A job control process 222 is a job control unit which controls the printer engine 131, scanner engine 135, or the like according to information processing associated with an operation input at the operation section 130 and implements a job operation. A data management process 223 is a data management unit which performs management of nonvolatile data recorded in the SRAM 112 and the HDD 113 and control of access to the nonvolatile data. A network process 224 is a network control unit which is responsible for communication in every kind of network protocol via the NIC driver 240.

A system monitoring and debug logging process 221 is a monitoring unit which is responsible for existence confirmation, i.e., confirming whether the UI control process 220 is operating normally and the function of recording and holding an operation log of the controller firmware 101. The system monitoring and debug logging process 221 is resident in the controller firmware 101. The system monitoring and debug logging process 221 provides the function of receiving operation logs output by the above processes, recording the operation logs in a log area 250 which is allocated in the RAM 111, and reading out the operation logs from the log area 250 as required.

The system monitoring and debug logging process 221 also monitors the UI control process 220 for abnormalities, i.e., to see whether the UI control process 220 is in an error condition. More specifically, the system monitoring and debug logging process 221 has the function of periodically exchanging messages for existence confirmation with the UI control process 220 and, if message exchange stops for a fixed time or longer, determining that the UI control process 220 is in an error condition. The system monitoring and debug logging process 221 further has the function of receiving notification of detection of insertion/retraction of a USB medium, such as the USB memory medium 140, into/from the USB driver 230 and receiving notification of detection of insertion/ extraction of the LAN cable 180 into/from the LAN connector 181 from the NIC driver 240. Accordingly, the USB driver 230 and NIC driver 240 can automatically recognize insertion/extraction of the USB memory medium 140 and the LAN cable 180, respectively.

<Schematic Configuration of Operation Section 130>

Figure 3:
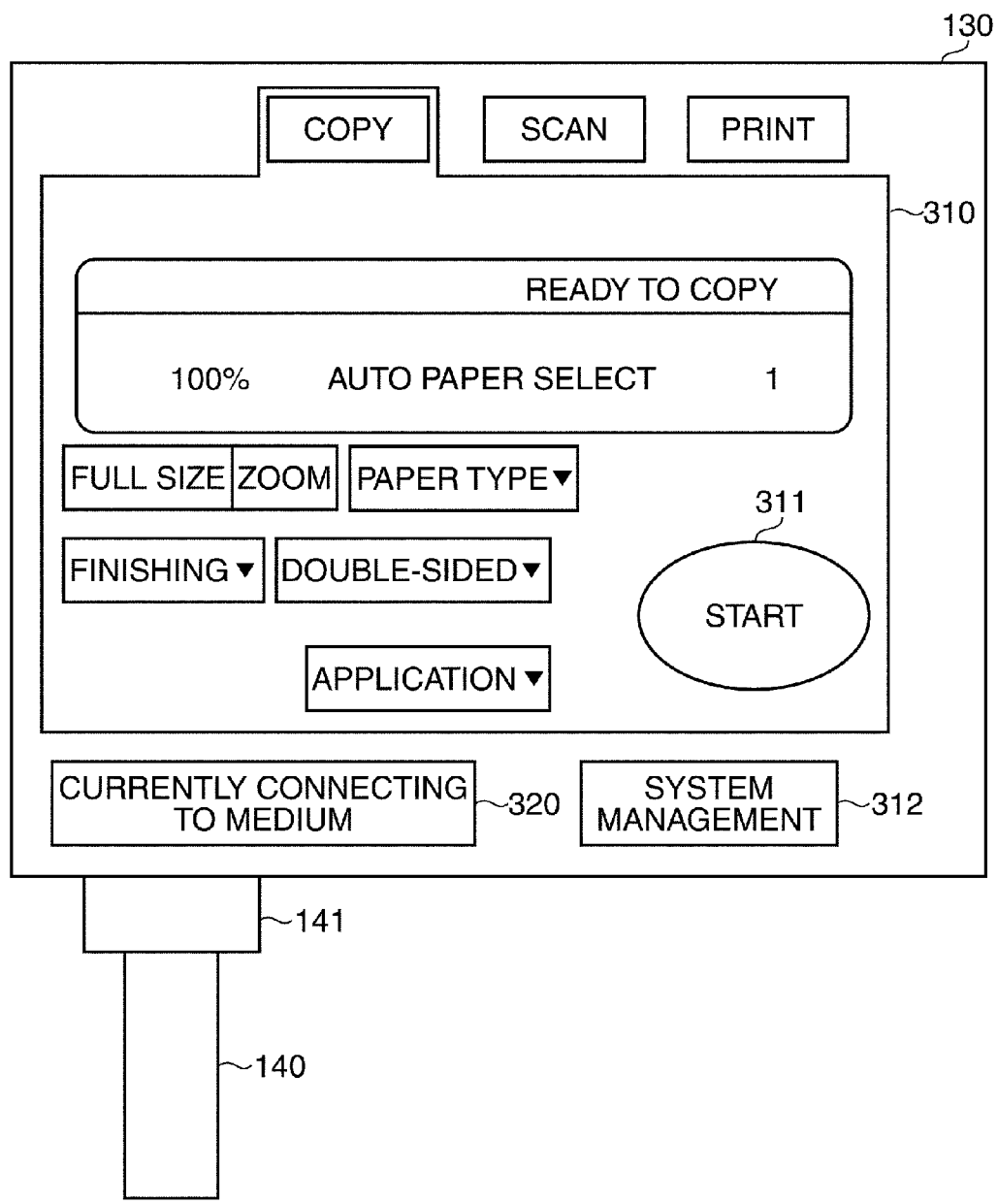
FIG. 3 is a view schematically showing the operation section shown in FIG. 1.

FIG. 3 is a view schematically showing the operation section 130 shown in FIG. 1. In the present embodiment, a user of the image processing apparatus 1 causes the image processing apparatus 1 to perform various functions provided by the image processing apparatus 1 by operating a touch panel shown as the operation section 130 in FIG. 3. A screen area 310 is a UI screen (display area) having a touch panel function and includes various function and setting buttons which can be selected. It should be noted that although a screen for a copy function which is one of a plurality of functions provided by the image processing apparatus 1 is shown in FIG. 3, a description of setting items in the screen which are not directly relevant to the configuration of the present invention will be omitted in the following description.

A copy start button 311 is a button which is to be pressed after a user makes settings for copy operation desired by the user. A press of the copy start button 311 triggers a series of copy operations including reading an original and outputting a printout. A system management button 312 is a button for opening a screen on which the status of the image processing apparatus 1 is displayed. The current status of the image processing apparatus 1 is displayed in a status display box 320.

The operation section 130 is provided with the USB connector 141 for connecting the USB memory medium 140. The USB memory medium 140 is recognized by the USB driver 230 and becomes available when the USB memory medium 140 is mounted to the USB connector 141. The status of the USB memory medium 140 is displayed in the status display box 320.

<Process of Retrieving Operation Log According to First Embodiment>

The process of retrieving an operation log while a UI control process 220 is operating normally will be first described. Although retrieving an operation log is necessary for investigating the cause of occurrence of some failure (bug) in controller firmware 101 (firmware), an operation button or the like related to an operation log is not displayed in a normal UI screen of an operation section 130 shown in FIG. 3.

For this reason, a special operation at the operation section 130 (UI screen) enables the USB memory medium 140 to retrieve an operation log. More specifically, according to the present embodiment, if a system management button 312 is pressed for a fixed time or longer, the UI control process 220 recognizes the press and notifies the system monitoring and debug logging process 221. The UI control process 220 retrieves an operation log by writing the operation log to the USB memory medium 140.

According to a conventional technique, if the UI control process 220 stops operation due to, e.g., software exceptions, the UI control process 220 cannot recognize the operation of "Continuously pressing the system management button 312 for the fixed time or longer (long press)" itself through the operation section 130 (UI screen). Thus, the UI control process 220 cannot retrieve an operation log.

In contrast, according to the first embodiment, an operation log can be retrieved not only when the UI control process 220 is operating normally but also when the UI control process 220 is stopped. A processing flow for the retrieving will be described below.

Figure 4:
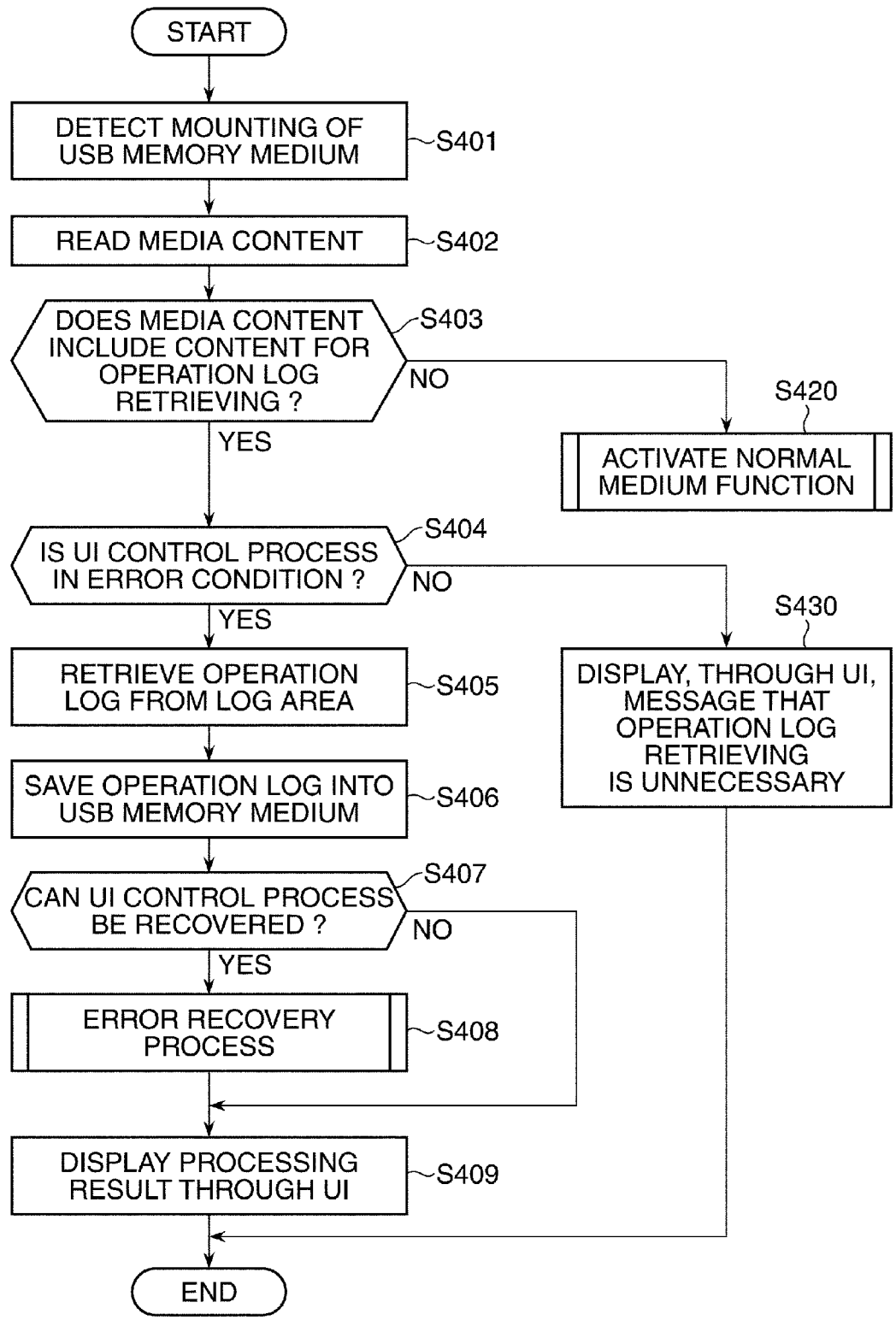
FIG. 4 is a flowchart showing the procedure for the process of automatically acquiring an operation log according to a first embodiment of the present invention by the image processing apparatus in FIG. 1.

FIG. 4 is a flowchart showing the procedure for the process of automatically acquiring an operation log according to the first embodiment of the present invention by an image processing apparatus 1 in FIG. 1. First, the USB driver 230 detects mounting of the USB memory medium 140 (step S401). The USB driver 230 reads media content in the USB memory medium 140 (step S402) and determines whether or not the read media content includes content for operation log retrieving for debugging (step S403).

If the read media content does not include content for operation log retrieving ("NO" in step S403), the USB driver 230 activates a normal USB memory medium function (step S420). On the other hand, if the read media content includes content for operation log retrieving ("YES" in step S403), the USB driver 230 transmits, to the system monitoring and debug logging process 221, USB detection notification for notifying the system monitoring and debug logging process 221 that the USB memory medium 140 for operation log retrieving has been mounted.

The system monitoring and debug logging process 221 determines whether or not the UI control process 220 is responding normally to an existence confirmation request, i.e., the UI control process 220 is in an error condition (step S404). If the UI control process 220 is responding normally ("NO" in step S404), since an operation log need not be retrieved, the UI control process 220 displays a message indicating that "operation log acquisition is unnecessary" in the status display box 320 of the operation section 130 (step S430) and ends the process.

On the other hand, if the UI control process 220 is not responding normally ("YES" in step S404), the process proceeds to step S405 to perform a process of retrieving an operation log automatically. In step S405, the system monitoring and debug logging process 221 performs the process of retrieving, as a file, an operation log held in the log area 250.

The system monitoring and debug logging process 221 writes the operation log to the USB memory medium 140 and saves the operation log (step S406).

When the processes to step S406 end, the process of retrieving an operation log while the UI control process 220 is in a stopped state has been completed. Accordingly, a firmware developer can investigate, e.g., the cause for stopping the UI control process 220 by analyzing the operation log retrieved in the USB memory medium 140.

After step S406, the system monitoring and debug logging process 221 determines whether or not error recovery for the UI control process 220 is possible (step S407). If the error recovery is not possible ("NO" in step S407), the system monitoring and debug logging process 221 displays a message that an operation log has been acquired (a processing result) in the status display box 320 (step S409) and ends the process. On the other hand, if the error recovery is possible ("YES" in step S407), the system monitoring and debug logging process 221 performs an error recovery process (step S408), then displays a processing result in the status display box 320 (step S409), and ends the process.

Figure 5:
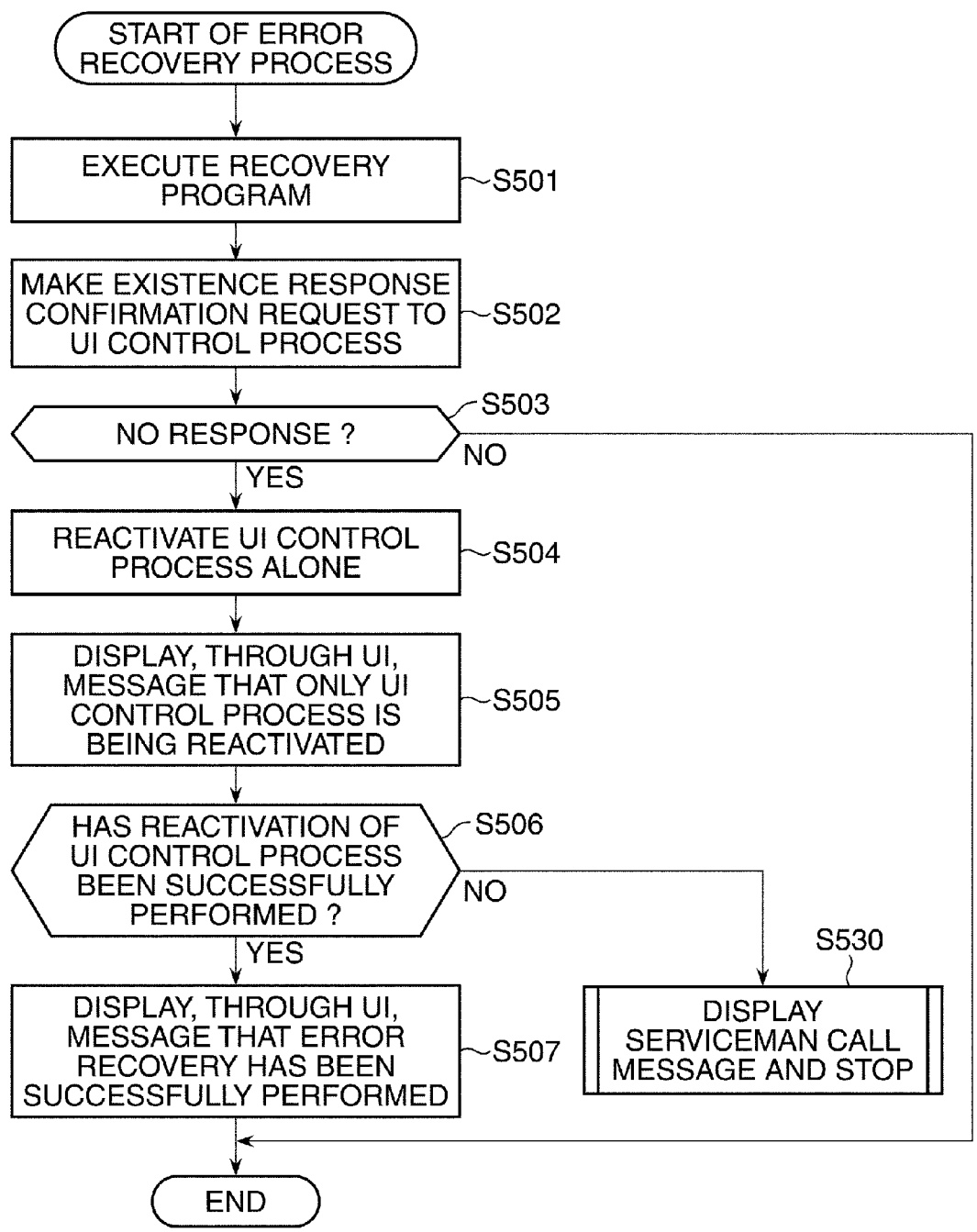
FIG. 5 is a flowchart showing the procedure for the details of the process in step S408 (error recovery) shown in FIG. 4.

FIG. 5 is a flowchart showing the procedure for the details of the process in step S408 (error recovery) shown in FIG. 4. The system monitoring and debug logging process 221 activates and executes a recovery program (step S501) and makes an existence response confirmation request to the UI control process 220 (step S502). The system monitoring and debug logging process 221 determines whether or not there is a response to the existence response confirmation request (step S503).

If there is a response to the existence response confirmation request ("NO" in step S503), the system monitoring and debug logging process 221 determines that the UI control process 220 has recovered from the error condition and ends the process without performing the recovery process. On the other hand, if there is no response to the existence response confirmation request ("YES" in step S503), the system monitoring and debug logging process 221 reactivates the UI control process 220 alone (step S504). The system monitoring and debug logging process 221 displays a message to that effect in the status display box 320 during the reactivation of the UI control process 220 (step S505).

When the reactivation of the UI control process 220 ends, the system monitoring and debug logging process 221 determines whether or not the reactivation has been successfully performed, by making a second existence response confirmation request to the UI control process 220 (step S506). If there is a normal response from the UI control process 220 to the second existence response confirmation request ("YES" in step S506), the system monitoring and debug logging process 221 determines that the reactivation has been successfully performed. The system monitoring and debug logging process 221 displays a message that the error recovery has been successfully performed in the screen area 310 (UI screen) of the operation section 130 (step S507) and ends the process. On the other hand, if there is no normal response from the UI control process 220 to the second existence response confirmation request ("NO" in step S506), the system monitoring and debug logging process 221 determines that the reactivation has failed. The system monitoring and debug logging process 221 displays a serviceman call message (error message) in the screen area 310 (UI screen) of the operation section 130 (step S530) and ends the process.

According to the present embodiment, when the USB memory medium 140 is connected to the image processing apparatus 1, whether an operation log of the image processing apparatus 1 needs to be retrieved is determined according to media content in the USB memory medium 140. Thus, an operation log can be automatically retrieved in the USB memory medium 140 only if the USB memory medium 140 contains content for operation log retrieving. Even when the UI control process 220 of the image processing apparatus 1 is stopped, an operation log can be efficiently retrieved. It should be noted that the USB memory medium 140 is used as an example of a memory medium mounted to the image processing apparatus 1 in the present embodiment, the present invention may be implemented using various other memory media.

<Process of Retrieving Operation Log According to Second Embodiment>

In the image processing apparatus 1 according to the first embodiment, detection of insertion of the USB memory medium 140 is used as a direct trigger to start the process of retrieving an operation log. In contrast, in a second embodiment, the process of retrieving an operation log using a memory medium present in an external network with which an image processing apparatus 1 performs data communication via a LAN cable 180 is started upon detection of insertion/extraction of the LAN cable 180 as a trigger.

Figure 6:
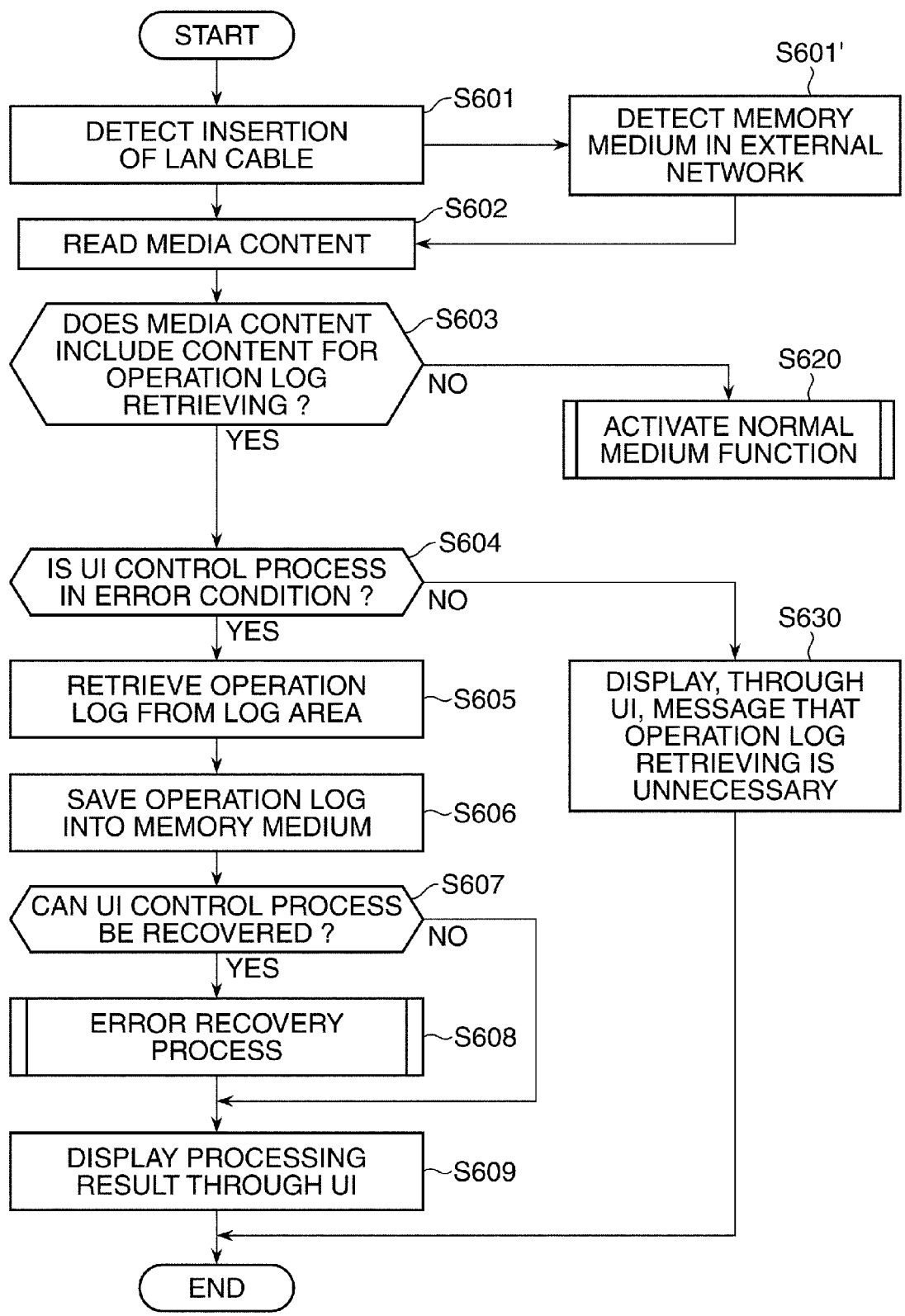
FIG. 6 is a flowchart showing the procedure for the process of automatically acquiring an operation log according to a second embodiment of the present invention by the image processing apparatus in FIG. 1.

FIG. 6 is a flowchart showing the procedure for the process of automatically acquiring an operation log according to the second embodiment of the present invention by the image processing apparatus 1 in FIG. 1. In step S401 of the flowchart in FIG. 4, mounting of the USB memory medium 140 is detected. In contrast, in step S601 of the flowchart in FIG. 6, insertion (linking) of the LAN cable 180 is firstly detected. In the second embodiment, after the process in step S601, the image processing apparatus 1 detects the presence of a memory medium in the external network, with which the image processing apparatus 1 performs data communication via the LAN cable 180 (step S601'). The detection of insertion of the LAN cable 180 and detection of the memory medium in the external network are performed by the NIC driver 240. The NIC driver 240 notifies a system monitoring and debug logging process 221 of a detection result.

The processes in steps S602 to S609, S620, and S630 shown in the flowchart in FIG. 6 are the same as the processes in steps S402 to S409, S420, and S430, respectively, of the flowchart in FIG. 4. Accordingly, a description of the details of the processes will be omitted in the present embodiment. The second embodiment can, of course, achieve the same advantages as those in the first embodiment. It should be noted that although the present embodiment has illustrated a case where a memory medium is present in the external network with which the image processing apparatus 1 performs data communication via the LAN cable 180, the present invention can also be implemented by using another cable such as a USB cable, as long as the another cable connects the image processing apparatus 1 according to the present invention and a memory medium.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2011-140674, filed Jun. 24, 2011, which is hereby incorporated by reference herein in its entirety.

What is claimed is:

1. An information processing apparatus comprising:
a user interface;
a user interface control unit configured to recognize an operation input at said user interface, performs information processing associated with the operation input, and control display of a status of the information processing apparatus in said user interface;
a monitoring unit configured to monitor said user interface control unit to determine whether or not said user interface control unit is in an error condition;
a device interface configured to allow use of an external device including a storage unit when the external device is connected to the information processing apparatus;
a detection unit configured to detect connection of the external device; and
a holding unit configured, when an operation log is outputted from at least one of said user interface control unit, said monitoring unit, and said detection unit, to hold the outputted operation log,
wherein said detection unit comprises
a content determination unit configured to determine whether or not debug content for retrieving the held operation log for debugging is present in the external device upon detection of connection of the external device, and
a notification unit configured to notify said monitoring unit of a message that the external device is connected if said content determination unit determines that the debug content is present in the external device, and
wherein said monitoring unit includes
an error determination start unit configured to start determining whether or not said user interface control unit is in an error condition when the message is notified to said monitoring unit by said notification unit,
a retrieving unit configured to retrieve the operation log from said holding unit if a result of the determination started by said error determination start unit shows that said user interface control unit is in an error condition, and
an operation log saving unit configured to save the operation log retrieved by said retrieving unit, into said storage unit of the external device,
wherein said user interface control unit, said monitoring unit, said detection unit, and said holding unit are implemented, at least in part, by a hardware processor.

2. The information processing apparatus according to claim 1, wherein said device interface is a USB interface.

3. The information processing apparatus according to claim 1, wherein said device interface is a network interface, and said detection unit detects connection of the external device when a LAN cable is connected to the information processing apparatus, and said detection unit detects that the external device is present in an external network with which the information processing apparatus performs data communication via the LAN cable.

4. The information processing apparatus according to claim 1, wherein said monitoring unit reactivates information processing by said user interface control unit alone when said user interface control unit is in an error condition.

5. An information processing method for an information processing apparatus,
wherein the information processing apparatus comprises:
a user interface;
a user interface control unit configured to recognize an operation input at said user interface, performs information processing associated with the operation input, and control display of a status of the information processing apparatus in the user interface;
a monitoring unit configured to monitor said user interface control unit to determine whether or not said user interface control unit is in an error condition;
a device interface configured to allow use of an external device including a storage unit when the external device is connected to the information processing apparatus;
a detection unit configured to detect connection of the external device; and
a holding unit configured, when an operation log is outputted from at least one of said user interface control unit, said monitoring unit, and said detection unit, to hold the outputted operation log, and
the information processing method comprises:
a content determination step of determining whether or not debug content for retrieving the held operation log for debugging is present in the external device upon detection of connection of the external device by said detection unit;
a notification step of notifying said monitoring unit of a message that the external device is connected if it is determined in said content determination step that the debug content is present in the external device;
an error determination start step of causing said monitoring unit to start determining whether or not said user interface control unit is in an error condition when the message is notified to said monitoring unit in said notification step;
a retrieving step of retrieving the operation log from said holding unit if a result of the determination started in said error determination start step shows that said user interface control unit is in an error condition; and
an operation log saving step of saving the operation log retrieved in said retrieving step, into said storage unit of the external device.

6. A non-transitory computer-readable storage medium storing a program for causing a computer to implement an information processing method for an information processing apparatus,
wherein the information processing apparatus comprises:
a user interface;
a user interface control unit configured to recognize an operation input at said user interface, performs information processing associated with the operation input, and control display of a status of the information processing apparatus in the user interface;
a monitoring unit configured to monitor said user interface control unit to determine whether or not said user interface control unit is in an error condition;
a device interface configured to allow use of an external device including a storage unit when the external device is connected to the information processing apparatus;
a detection unit configured to detect connection of the external device; and
a holding unit configured, when an operation log is outputted from at least one of said user interface control unit, said monitoring unit, and said detection unit, to hold the outputted operation log, and in the information processing method, said detection unit executes:

a content determination step of determining whether or not debug content for retrieving the held operation log for debugging is present in the external device upon detection of connection of the external device by said detection unit;

a notification step of notifying said monitoring unit of a message that the external device is connected if it is determined in said content determination step that the debug content is present in the external device;

an error determination start step of causing said monitoring unit to start determining whether or not said user interface control unit is in an error condition when the message is notified to said monitoring unit in said notification step;

a retrieving step of retrieving the operation log from said holding unit if a result of the determination started in said error determination start step shows that said user interface control unit is in an error condition; and an operation log saving step of saving the operation log retrieved in said retrieving step, into said storage unit of the external device.

* * * * *